United States Patent
Barbosa De Moura et al.

(10) Patent No.: US 12,309,177 B2
(45) Date of Patent: May 20, 2025

(54) METHOD TO DETECT ATTACKS IN A NETWORK CONNECTION

(71) Applicant: SAMSUNG ELETRÔNICA DA AMAZÔNIA LTDA., São Paulo (BR)

(72) Inventors: Ickson Barbosa De Moura, Recife (BR); Fábio Leitão De Urquiza E Silva, Recife (BR); Igor Jochem Sanz, Campinas (BR)

(73) Assignee: SAMSUNG ELETRÔNICA DA AMAZÔNIA LTDA., Campinas (BR)

( * ) Notice: Subject to any disclaimer, the term of this patent is extended or adjusted under 35 U.S.C. 154(b) by 274 days.

(21) Appl. No.: 18/113,647

(22) Filed: Feb. 24, 2023

(65) Prior Publication Data
US 2024/0244062 A1  Jul. 18, 2024

(30) Foreign Application Priority Data
Jan. 18, 2023  (BR) ...................... 10 2023 000928-0

(51) Int. Cl.
*H04L 9/40* (2022.01)
(52) U.S. Cl.
CPC ........ *H04L 63/1416* (2013.01); *H04L 63/166* (2013.01)
(58) Field of Classification Search
CPC ............... H04L 63/1416; H04L 63/166; H04L 63/0823; H04L 63/205; H04L 63/102; H04L 63/1433; H04L 63/20
See application file for complete search history.

(56) References Cited

U.S. PATENT DOCUMENTS

| | | | |
|---|---|---|---|
| 9,621,544 B2 | 4/2017 | Taboso | |
| 9,628,502 B2 | 4/2017 | Clark et al. | |
| 11,363,072 B1 * | 6/2022 | Relan | G06F 9/451 |
| 11,695,796 B1 * | 7/2023 | Chen | H04L 63/1433 |
| | | | 713/151 |
| 2015/0341341 A1 * | 11/2015 | Messerges | H04L 9/32 |
| | | | 713/151 |
| 2015/0373013 A1 * | 12/2015 | Gupta | H04L 63/0823 |
| | | | 726/10 |
| 2016/0344544 A1 * | 11/2016 | Biesinger | H04L 63/20 |

(Continued)

FOREIGN PATENT DOCUMENTS

CN  113300848 A  *  8/2021  .......... H04L 9/3263

OTHER PUBLICATIONS

Hu et al, A large-scale analysis of HTTPS deployments: Challenges, solutions, and recommendations, ISO Press, abstract p. 1-2 (Year: 2021).*

(Continued)

*Primary Examiner* — Christopher A Revak (57) ABSTRACT

A method to detect the presence of SSL-based attacks over a network where a device is connected to, even if the attack pattern is not previously known (zero-day attacks). The invention enabled be used in any mobile device (e.g., smartphones, tablets, notebooks, wearables, Smart TVs, or IoT devices) that relies on wireless communications as it does not require hardware changes and has low computational overhead. The invention can also be used on any device that connects to the Internet by other means, either through the use of mobile communications (4G/5G) or wired networks.

10 Claims, 7 Drawing Sheets

(56) References Cited

U.S. PATENT DOCUMENTS

| | | | |
|---|---|---|---|
| 2018/0191509 A1* | 7/2018 | Lakshminarayan | H04L 67/34 |
| 2019/0253410 A1* | 8/2019 | Joyner | H04L 63/0823 |
| 2020/0007568 A1 | 1/2020 | Frayman et al. | |
| 2021/0344511 A1 | 11/2021 | Devarajan et al. | |
| 2022/0385678 A1* | 12/2022 | Bobak | H04L 41/22 |
| 2023/0049980 A1* | 2/2023 | Sharma | H04W 12/041 |
| 2023/0328103 A1* | 10/2023 | Kaliavaradhan | H04L 67/133 |
| | | | 726/4 |

OTHER PUBLICATIONS

Busygin et al, Approaches to Protection of Applications Based on the TLS Protocol against Attacks Using Revoked Certificates, Automatic Control and Computer Sciences, p. 1-6 (Year: 2016).*

Hu et al, machine translation of CN 113300848 A key words in context, 1 page (Year: 2021).*

* cited by examiner

METHOD TO DETECT ATTACKS IN A NETWORK CONNECTION

CROSS-REFERENCE TO RELATED APPLICATION (S)

This application is based on and claims priority under 35 U.S.C. § 119 to Brazilian Patent Application No. BR 10 2023 000928-0, filed on Jan. 18, 2023, in the Brazilian Intellectual Property Office, the disclosure of which is incorporated by reference herein in its entirety.

TECHNICAL FIELD

The present invention relates to network communication and the computer security fields and defines methods to detect inappropriate behavior and suspicious characteristics of SSL/TLS communications, which may indicate the presence of an attack, such as Man-in-the-Middle (MitM) attack. To detect those scenarios, the present invention relies on an analysis of the characteristics of the Hyper Text Transfer Protocol Secure (HTTPS) traffic exchanged over the current network by an endpoint device.

Several characteristics of the connection and the messages sent by Hyper Text Transfer Protocol (HTTP) and HTTPS servers are extracted, analyzed, compared to expected responses, and converted to features that are weighted to determine suspicious activities. Such characteristics include the SSL/TLS parameters received from the web servers, the common name field and expiration date field of the SSL certificate, the TLS version and cipher suite negotiated during the Handshake, the time taken to send and receive each message from the Handshake process, whether the SSL certificate has been revoked, and whether the protocol methods used to verify this feature are functional on the network environment of the endpoint device.

In the telecommunications field, several protocols exist to provide communication across different devices and users. At the beginning of the Internet, the communication protocols used to send and receive data in plaintext, such as the HTTP, allowed an attacker to easily intercept the exchanged traffic to read or modify the information. A common scenario where this issue occurs comprehends a user connecting a smartphone to a public Wi-Fi Access Point (AP), using the AP as a gateway to the Internet. If the AP is malicious or infected, it can perform eavesdropping, steal user credentials, access sensitive information, or inject malware to webpages. To prevent such attacks, a layer of security at the application level must be employed to those protocols.

BACKGROUND

The HTTPS was initially conceived to embody a new security layer for the insecure HTTP protocol, the Secure Sockets Layer (SSL). In 1995, the SSL 2.0 was released but was soon replaced by the SSL 3.0 in the following year, due to security flaws (the SSL 1.0 was never publicly released). To resolve more security issues and create a public version of the SSL protocol, in 1999, the IETF (Internet Engineering Task Force) standardized a protocol named Transport Layer Security, or TLS 1.0, an update of the SSL 3.0 protocol.

New security flaws and vulnerabilities were discovered, and new versions of the TLS protocol were released since then, the TLS 1.1 in 2006, the TLS 1.2 in 2008, and the latest version and most secure, the TLS 1.3 in 2018. Thereby, in the current versions of the protocols, the data are sent and received in ciphertext, making it difficult for an attacker to read or modify the traffic.

A TLS connection between two endpoints initiates using a sequence known as the TLS Handshake. The TLS Handshake is a method of negotiation between the application and the web server to verify the integrity of a connection with a real web server and define the connection parameters to use in the next operations of the communication and create a secure channel. From TLS 1.0 to TLS 1.2, the TLS Handshake process remains the same and contains weaknesses that several publicly disclosed threats explored. TLS 1.3 introduced slight changes to the handshake to improve security and efficiency. Still, TLS 1.3 adoption is very low worldwide and TLS 1.2 remains the most used protocol for SSL/TLS communications on the Internet, implying that most public IPs are susceptible to some type of MitM attack when not correctly configured.

Since both SSL and TLS represent an evolution of the same technology, they share similar characteristics. Those protocols use two parameters to maintain communications security: a certificate for the client to verify the server's identity and an algorithm (negotiated between the client and the server) to encrypt the traffic. Most of MitM attacks targeting SSL/TLS protocols aim to explore weakness and vulnerabilities in those mechanisms, such as by intercepting the handshake messages exchanged between the client and the server, sending misconfigured SSL certificates (such as expired, revoked, or self-signed certificates), or forcing the use of weak encryption algorithms, enabling an attacker to read or modify the transmitted information. In addition, attackers can take advantage of other attack surfaces to modify system configurations (such as the date), making it easier to exploit vulnerabilities of those protocols.

Then, for a connection to be secure, the applications used by clients and servers should only allow strong and secure configurations that address disclosed vulnerabilities. Nevertheless, to retain compatibility with older devices, some applications still allow the use of older SSL/TLS versions and weaker ciphers. As result, many protocol weaknesses remain exploitable in current Internet servers, depending on the webserver configuration, the correctness of the SSL/TLS implementations on the endpoints, and the SSL/TLS protocol backward compatibility. Thus, in such scenarios, an attacker could still exploit those vulnerabilities and be able to read credentials or sensitive information, or to modify traffic.

In this sense, the method further described in the present invention analyzes the behavior of the communications that uses the TLS protocol, the parameters negotiated between the user and the server for determining if a Man-in-the-Middle attack is occurring. Thus, the proposed method can identify different classes of attack against the TLS protocol. In addition, this method was designed to be used in different devices, since it uses local processing with minor hardware resource requirements, while affording low detection time and high accuracy.

For the sake of comparison, state-of-the-art documents and their main differences and similarities to the present application will be presented in the following paragraphs.

The U.S. Pat. No. 9,621,544 entitled "Computer implemented method of analyzing X.509 certificates in SSL/TLS communications and the data-processing system", published on Apr. 11, 2017, by THE BOEING COMPANY, describes a method of analyzing X.509 certificates in SSL/TLS communications. The method comprises: extracting a security certificate used during a secure handshake protocol; storing the security certificate in a certificate database; and determining whether the security certificate exhibits a grade of polymorphism with respect to a stored version of the security certificate. However, the method only checks whether the SSL certificates are valid or not and requires a database to store the certificate.

The U.S. Pat. No. 9,628,502 entitled "Active attack detection system", published on Apr. 18, 2017, by Meadow Hills LLC, describes a system that is configured to detect common security threats in wireless and wired computer networks, such as ARP attacks, Evil Twin, and Denial-of-Service attacks. While this document focuses on other types of Man-in-the-Middle (MitM) and network attacks, it does not consider the exploitation of SSL/TLS protocols. The present invention, instead, considers a set of different parameters such as SSL certificate characteristics, the OCSP protocol, and the information obtained during the TLS handshake, to detect Man-in-the-Middle attack.

The patent document US2021344511A1 entitled, published on Nov. 4, 2021, by Zscaler describes a system that uses a remote server that acts as an SSL/TLS proxy. The TLS/HTTPS traffic is intercepted and sent to a cloud system to analyze the parameters of that communication. Such workflow differs from the present invention, because it does not require traffic interception and, as a consequence, does not create a potential communication latency. In addition, the present invention also checks different parameters, such as whether the SSL certificate has expired or been revoked, and whether the TLS version and cipher suite chosen during the handshake is weak or not.

The patent document US20200007568A1 entitled "Extracting Encryption Metadata and Terminating Malicious Connections Using Machine Learning", published on Jan. 2, 2020, by Cujo LLC, describes a method to be used on "Smart" appliances that are installed in a middle of network to analyze all encrypted traffic. Thus, the target devices require a large amount of hardware resources and can only be used for this purpose. The method analyzes the parameters (e.g., cipher suite, SSL/TLS version, etc.) negotiated during the handshake to verify if a Man-in-the-Middle attack is being performed. This process is also done by the present invention for the same purpose, with the distinction that the disclosed method uses known malicious data to verify whether the behavior corresponds to an attack. The present invention may also use a previously list of trustworthy web servers, in which the behavior is already known and dependable. Furthermore, our invention can be used on devices that have few hardware resources and work independently of other applications or devices, being protected in any network it is connected.

The methods found in the state of the art and the one described herein are intended to detect attacks against the TLS protocol. However, the present application is capable of detecting other types of attacks, such as attacks that modify the operating system's date, NTP Spoofing attack and NTP Poisoning attack.

To detect a SSL/TTL attack, some methods in the state of the art check whether a weak encryption algorithm was chosen, and other methods check whether the SSL certificate has an invalid parameter. Therefore, they are more restricted and need to act together to detect several attacks. The method proposed by the present invention includes checking if a weak encryption algorithm was chosen, checking if the SSL protocol or a weak version of TLS was negotiated between the user and the client, and comparing the dates of various SSL certificates with the OS date to analyze if an attack was carried out to modify the device date, verifying if a revoked SSL certificate is being used and if it is possible to check the status of the certificates using the OCSP protocol and checking if the SSL certificate has an invalid parameter.

In addition, the method proposed herein uses local processing, fewer hardware resources, and accomplishes a low detection time and high accuracy, allowing it to be used in restrained processing devices. Moreover, the present methods were conceived to be difficulty for design around, focusing on a bottom-up approach, initially targeting detection of specific attacks and then expanding the methods to generalize the core ideas for detection of any type of attacks, including attacks that are not known today.

SUMMARY

A method to detect attacks in an internet connection, comprising: receiving a list of N known and secure servers S; sending a HTTPS request to a server among the list of N known and secure servers S; for each HTTPS request successfully received, capturing parameters including at least a Transport Layer Security (TLS) version, a Cipher Suite, Secure Sockets Layer (SSL) certificates, Online Certificate Status Protocol (OCSP) parameters, a handshake time; analyzing TLS connections to determine whether a weak cipher suite or an old TLS version is being used; upon determining a TLS version is updated and a strong cipher is being used according to the analyzing, verifying the SSL certificates so as to determine whether the SSL certificates are suspicious or a system date was modified; provided no more than one suspicious SSL certificate among the SSL certificates is detected and the system date is unmodified, checking whether OCSP responses were blocked or modified; provided the OCSP responses are not blocked or modified, determining that no attack has been detected; and provided the OCSP responses are blocked or modified, determining the internet connection as suspicious.

BRIEF DESCRIPTION OF THE DRAWINGS

The objectives and advantages of the current invention will become clearer through the following detailed description of the example and non-limitative drawings presented at the end of this document.

DETAILED DESCRIPTION

The purpose of the present method is to detect suspicious behavior during HTTPS connections between an application and a web server, which may indicate the existence of an attack. More specifically, the proposed method relies on sending HTTPS requests to specific web servers and analyzing specific characteristics of the established connections to detect signals of interception or adulteration on the communication channel, such as forcing the use of insecure parameters that can be used to perform a MitM attack. This implementation does not require system modifications and can be deployed at the application level of an endpoint device.

The proposed method may be integrated with the operating system kernel of an endpoint, or hooked to a network interface sniffer, to access and analyze network packets of the handshake messages exchanged by the device. Thus, it would passively check for malicious packets without generating new packets over that network.

According to an embodiment of the present invention, a method is provided to detect the presence of SSL-based attacks over a network or a Wi-Fi Access Point where a device is connected to, even if the attack pattern is not previously known (zero-day attacks). The invention can be used in any mobile device (e.g., smartphones, tablets, notebooks, wearables, Smart TVs, or IoT devices) that relies on wireless communications as it does not require hardware changes and has low computational overhead. The invention can also be used on any device that connects to the Internet by other means, either through the use of mobile communications (4G/5G) or wired networks.

Particularly, the present invention aims to detect, with high precision (closest to zero false positives) and high recall (low false negatives), attacks that rely on SSL/TLS vulnerability exploration, while consuming as little as possible of hardware, processing, network, and time resources.

The attacks that rely on SSL/TLS vulnerabilities that this invention aims to detect are:

Revoked or expired SSL certificate attacks;
TLS handshake weak ciphers attacks, such as POODLE, Freak, ROBOT attacks;
TLS handshake downgrade attacks;
Attacks that aim to modify the operating system date.

Figure 1:
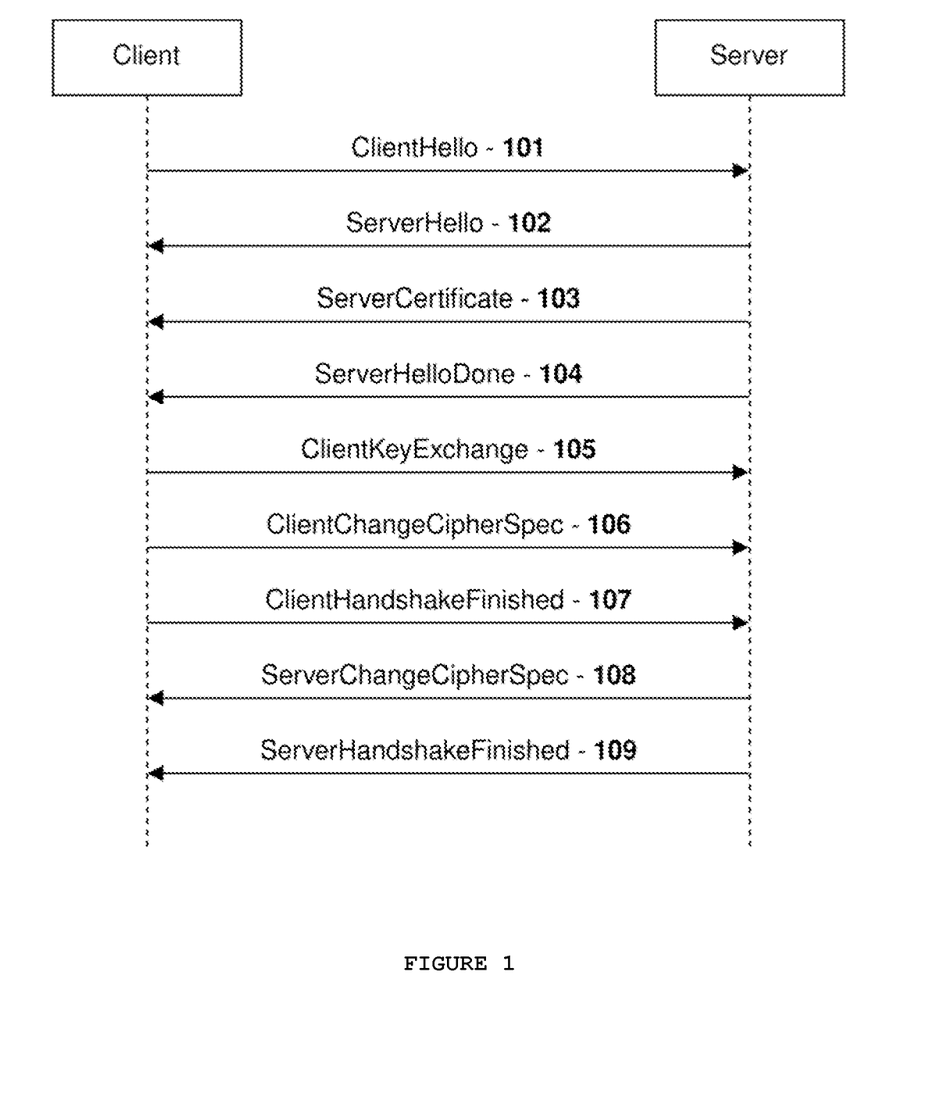
FIG. 1 illustrates the Handshake process used by the TLS protocol from version 1.0 to 1.2.

FIG. 1 shows the TLS handshake used in TLS 1.2 considered by the proposed detection method to analyze whether the security parameters are valid.

The TLS 1.2 handshake begins with the client sending a message known as "ClientHello" (101). In that message, the client sends the maximum supported TLS protocol version, client random data (used to generate the encryption key), session id, a list of cipher suites, a list of compression methods, and a list of extensions.

The server responds with a "ServerHello" message (102). That message contains the selected TLS version, server random data (also used to generate the encryption key), session id, selected cipher suite, the selected compression method, and a list of extensions. In addition, the server sends the message "ServerCertificate" (103) with various information, such as the hostname of the server, the public key, validity period, serial number, and data required (which may be other certificates) to validate whether the server certificate was issued by a Certificate Authority. Finally, it sends the message "ServerHelloDone" (104), indicating part of the Handshake has been completed.

Thus, the client sends the message "ClientKeyExchange" (105) to the server, informing the Pre-Master Secret, another parameter used to calculate the encryption keys. The message is encrypted using the public key, sent in the "ServerCertificate" (103). After that, the client sends the message "ClientChangeCipherSpec" (106) that calculated the shared encryption keys, hence all following messages from the client will be encrypted with the Client Write Key. Finally, the client calculates a hash of all handshake messages, encrypts it with the Client Write Key, and sends it to the server using the message "ClientHandshakeFinished" (107). This hash purpose is to check if any messages have been modified.

At this point, the client and server have the necessary information to calculate all the keys (Server Write Key, Server Read Key, Client Write Key, and Client Read Key). The server sends the message "ServerChangeCipherSpec" (108) to inform the client that the following messages from the server are encrypted with the Server Write Key. Finally, the server calculates a hash of all handshake messages and encrypts it with the Server Write Key and sends it to the client using the message "ServerHandshakeFinished" (109). If the entire handshake succeeds, the client and server initiate communication with "Application data". Depending on the cipher suite negotiated, the handshake might suppress some messages.

The SSL/TLS attacks aim to intercept messages sent and received during the TLS handshake to read or modify the keys used to encrypt the information. Thus, if an attacker has access to those keys, it is possible to read or modify any message exchanged between the user and the web server during that communication. Therefore, one embodiment of the proposed method relies on the analysis of the messages that contain information that could cause those keys to be leaked or changed. Those messages are: "ServerHello" (102); "ServerCertificate" (103); the time required to send "ClientKeyExchange" (105); and the time to receive the "ServerChangeCipherSpec" (108).

The "ServerHello" (102) message contains information about the TLS version and the cipher suite negotiated. Thus, if one of these parameters is weak, an attacker could exploit the vulnerabilities and read or modify the subsequent messages, including the messages that contain the keys. Furthermore, if the server takes too long to respond that it calculated its encryption key, through the "ServerChangeCipherSpec" (108) message, it is possible that an attacker is intercepting the messages or running computations to discover the calculated keys.

Another way to perform an attack is to create a fake server and use an invalid SSL Certificate to work as a real web server. Therefore, another embodiment of the proposed method analyzes characteristics of the "ServerCertificate" (103) message, such as validity period and common name parameters. These parameters are used to validate whether the certificate is valid for that server, and if the Certificate Authority (CA) is recognized by the system. The attackers can also use a revoked SSL certificate to create a fake connection between the user and the real server. For that, it is also verified if the SSL Certificate has been revoked using the methods provided by the CA. By default, several methods can be used to verify if an SSL certificate has been revoked, but the most commonly used are the Certificate Revoked List (CRL) and the Online Certificate Status Protocol (OCSP). When the CRL method is used, periodically a list of the revoked certificates must be updated. Then, on each TLS connection, the application can verify if the server certificate ID is in the list, thus indicating that the certificate has been revoked. Since this method requires that the list of the revoked certificates is updated periodically, more network usage and storage space are required. To avoid this, another protocol is used: the OCSP. In the OCSP protocol, after each TLS Handshake, the application makes a request (using the OCSP protocol) to the CA to verify if the certificate has been revoked. Currently, the OCSP is mostly used, especially on devices that require low network and storage usage. To verify if there is a problem with the communication between the device and the CA servers, this method performs OCSP requests and analyzes the responses. If the OCSP requests fail, new requests are made using port 80, which is also used by the OCSP protocol, to check if some application is blocking that port. If the servers respond to these requests, this is an indication that an attacker may be using an SSL revocation attack and only blocking OCSP requests.

This method also uses the expiration period of the SSL Certificates to compare with the operating system date. If the dates are different, it may indicate that an attacker is using expired SSL certificates or that an attack has been performed and has changed the operating system date. Therefore, this method can also detect other types of attacks, such as time-based attacks, in addition to the SSL/TLS attacks. Time-based attacks often precede SSL/TLS attacks, since it takes advantage of a wrong system time to explore holes in communications protocols and invalid certificates usage.

Therefore, the method proposed on this invention relies on the combination of:
  analyzing the SSL/TLS endpoint traffic, either through by actively negotiating its own secure channel with Internet servers over an untrustworthy network on its best mode, or; as alternative mode, a passive deployment on the endpoint device that reads the exchanged packets;
  extracting abstracted information, metadata, and parameters from the SSL/TLS handshake messages, SSL certificate, and ciphers negotiated between the client and the server using the techniques defined; and
  employing analysis techniques to check whether the SSL/TLS communication is suspicious or is suffering a known or unknown MitM attack.

Figure 2:
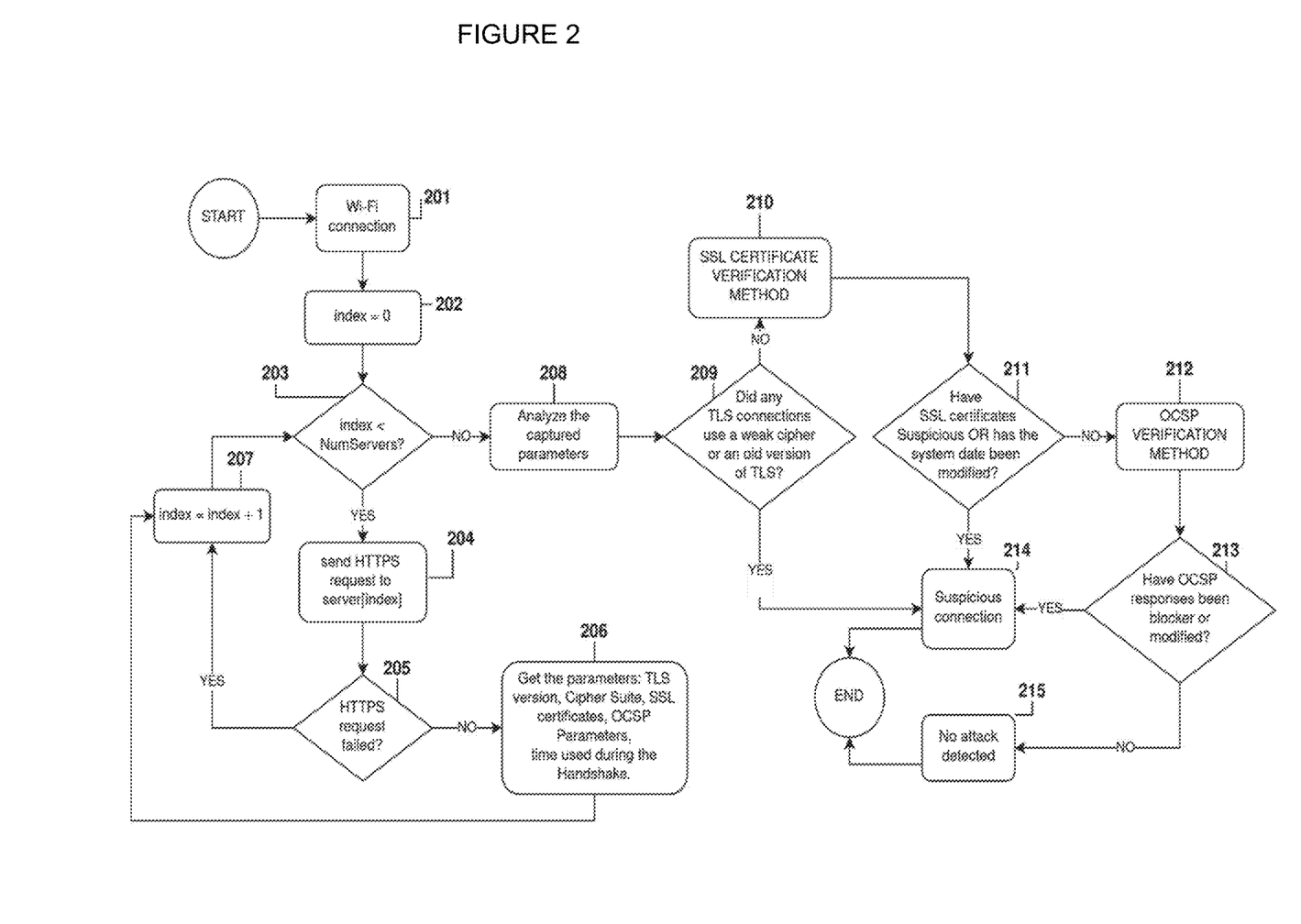
FIG. 2 presents an overview of an embodiment of the present invention.

The detection method consists of an end-point secure module that performs HTTPS requests to specific web servers after initiating an internet connection (201) and analyzing the response traffic at different levels. The objective of the analysis is to verify if there are any incorrect parameters that could be used to exploit a vulnerability of that protocol (208) or if there are any suspicious characteristics indicating the presence of MitM on that communication channel. On each request, the method captures the parameters negotiated during the TLS Handshake, such as TLS version, Cipher Suite, SSL certificate(s), OCSP parameters, and the time required to send and receive each message during the Handshake (206).

The HTTPS requests are sent to web servers that are secure and known. Thus, the parameters negotiated during the TLS handshake are known previously. Initially, a variable called index is initialized, which has the objective of indicating which server should be analyzed (202). An HTTPS request is made to each server (204) and verified if the connection is successful (205). If so, the TLS parameters are captured (206) and the "index" is incremented (207). After this process, it is verified whether the requests were made to all web servers (203). Then, after those requests, the method analyzes (208) whether an older version of TLS or a weak Cipher Suite was chosen (209) and whether the SSL certificate used is valid (211). If all parameters sent in the Handshake are as expected, it is used the OCSP protocol to verify if the SSL certificate has been revoked (212). In addition, attackers can block the OCSP requests and responses, preventing the status of each certificate from being verified. Consequently, a revoked certificate can be used to create a communication channel between the user and the real server, which can be read or modified by the attacker. To prevent this, the present method verifies if the OCSP requests are being blocked on the network (213). If so, it may indicate that a Man-in-the-Middle attack can be performed to exploit the HTTPS connections using malicious SSL certificates (214) or not (215).

In addition, the web servers selected for the HTTPS requests are purposely compatible with the latest TLS version (TLS 1.2 or higher). The TLS version 1.1 or earlier are considered insecure versions and are not used in a normal connection between the user and the web servers. Thus, if the TLS version 1.1 or earlier was chosen to be used during communication to a server (209), it represents an indication that the traffic is being intercepted.

The "Client Hello" message (101) informs which Cipher Suites are supported by the user application. To verify the use of a weak cipher, the crafted HTTPS request message purposely informs that the client supports several Cipher Suites options. The options are arranged to let the Ellipticcurve Diffie-Hellman (ECDHE) algorithm, which performs the key exchange, as higher priority option for the user, therefore, the web servers in a normal connection must accept it. If the web server informs a Cipher Suite with another algorithm to perform the key exchange (208), it is an indication that the Client Hello (101) or the Server Hello (102) has been modified.

If an older TLS version or a weak Cipher Suite is chosen (208), that connection is marked as "suspicious" (214). After analyzing all HTTPS requests, the detection method checks if any connection has been marked as "suspicious" and, if it is confirmed, the user is notified.

Figure 3:
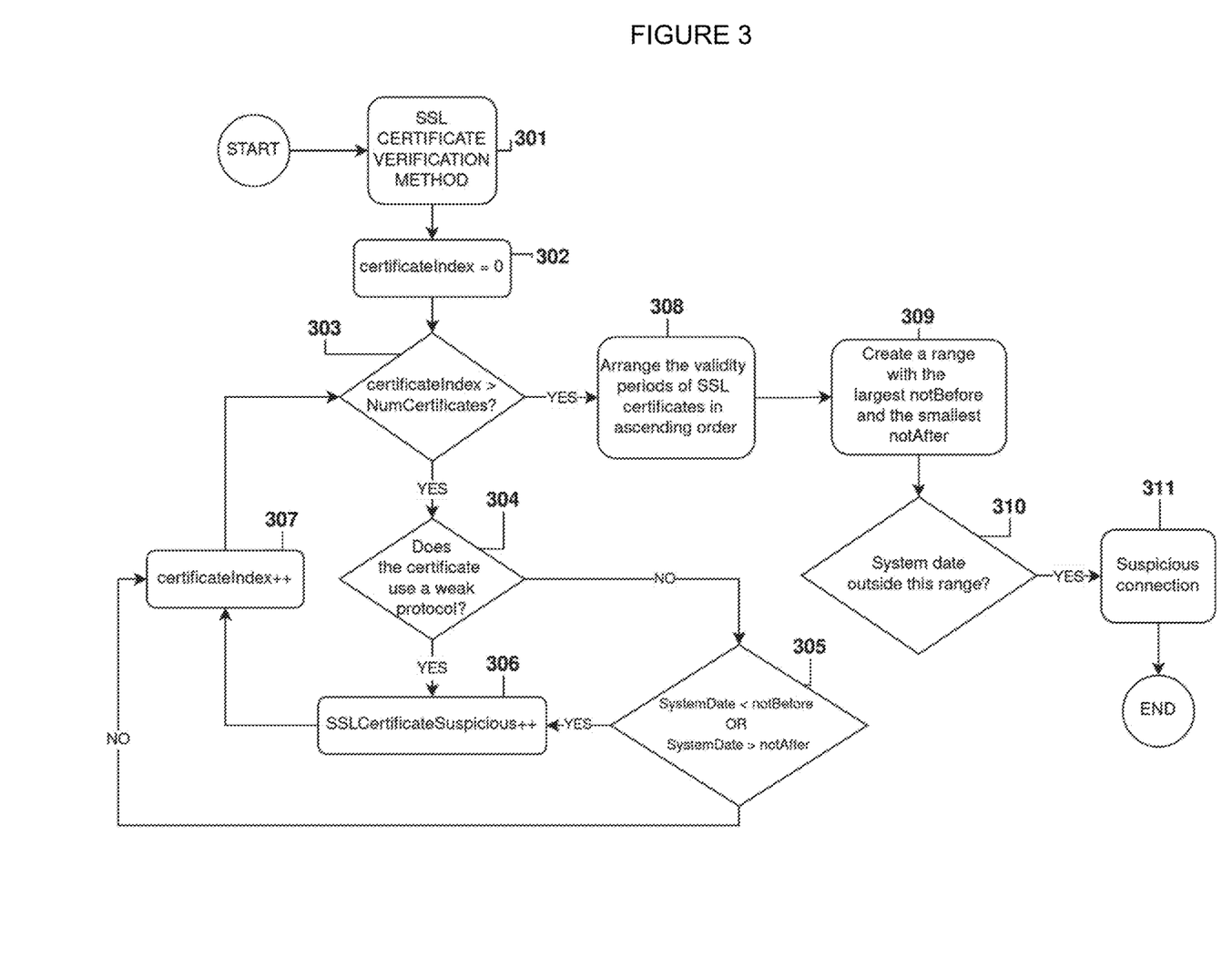
FIG. 3 illustrates operations used to verify Handshake characteristics and SSL certificate parameters according to an embodiment.

If the selected TLS version is the latest and the Cipher Suite negotiated is secure, many of existent threats are mitigated, however, attackers can still rely on the use of SSL certificates. Therefore, other secure checks are performed by the present method focusing on validating the integrity of the server certificate (210). Initially, a variable called certificateIndex is initialized, which has the objective of indicating which server should be analyzed (301) at each operation and preventing a server from being verified more than once. Then, it is verified if the SSL certificate uses a weak protocol (304). If positive, the certificate is marked as "suspicious" (306). Otherwise, the dates defined by the parameters "notBefore" and "notAfter" of the SSL certificate (304) sent by the server are compared with the system date (305). If the system date is outside the date range defined by these two parameters, this SSL certificate is considered as "suspicious" (306). In addition, the method checks if the system date is valid. For this, the validity periods of the SSL certificates are arranged in ascending order and a range is created with the largest notBefore and the smallest notAfter. Using this method, the period obtained is the closest to the current date. Then, if the system date is outside of this range, the connection is marked as "suspicious". If two or more SSL certificates have been marked as "suspicious" from all HTTPS requests sent, or there is an indicative that the system date has been modified (211), the user is notified that a MitM attack is being performed (214).

Figure 4:
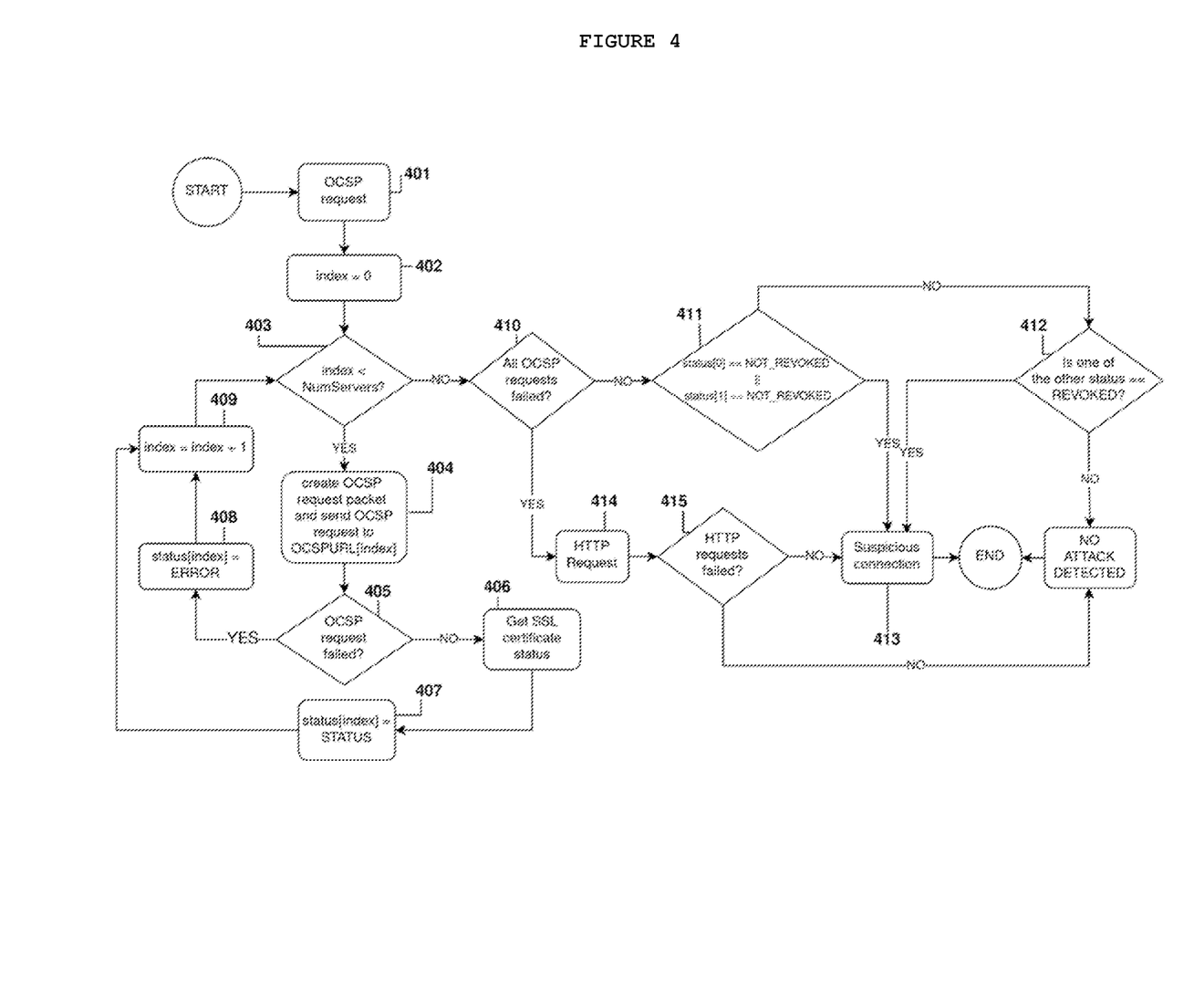
FIG. 4 shows illustrates operations of checking the OCSP requests and the use of revoked SSL certificates according to an embodiment.

After all the verification phases described above, this method verifies if it is possible to use OCSP protocol correctly (401). The OCSP requests are made using the port 80. Initially, a variable called index is initialized, which has the objective of indicating which OCSP server should be used (402). An OCSP request is made to each server (404) using the parameters obtained during the Handshake. Then, it is verified if the request has failed (405). If positive, the certificate status is stored as "error" (408). Otherwise, the certificate status is captured (406) and stored (407). Then, the "index" is incremented (409). After this process, it is verified whether the requests were made to all OCSP servers (403). The present method also stores two revoked SSL certificates and all SSL certificates used by the known servers. Therefore, the OCSP response status should as well be "revoked" for the first two certificates (411) and "not revoked" for the others (412) on a benign connection. If any status received different from expected, it means that the OCSP packets have been modified (413) and that a Man-in-the-Middle attack is being performed. If all OCSP requests fail (410), an HTTP request will be made for testing the connection at port 80 (414). Then, it is verified if that request is successful (415). If not, it is an indication that OCSP requests are being blocked (413) at the middle of the network, indicating that an attack is being performed.

The detection method described in this document consists of a secure end-point module that analyzes HTTPS response traffic at different levels, comprising the operations of:
receiving a list of N known and secure servers, wherein the list of known servers comprise, for example, bak servers, social media, governmental institutions servers, among others;
sending a HTTPS request to N servers;
for each successful HTTPS request, capturing the parameters: TLS version, Cipher Suite, SSL certificates, OCSP parameters, handshake time;
analyzing if TLS connections use a weak cipher suite or an old TLS version;
if the TLS version is updated and a strong cipher is on use, verifying if SSL certificates are suspicious or the system date was modified;
if no more than one suspicious SSL certificate is detected and the system date is unaffected, checking if OCSP responses were blocked or modified;
if OCSP responses are not blocked or modified, no attack is detected;
else consider the internet connection suspicious.

Differently from this embodiment, which analyzes specific HTTPS requests made to known web servers, the alternative embodiment described here captures and analyzes all HTTPS requests made by the user. As all HTTPS traffic is analyzed, the detection rate is higher than the previous embodiment, but the performance is slightly lower. The purpose of the analysis is to verify if there are incorrect parameters that can be used to exploit a vulnerability of this protocol or if there are suspicious characteristics that indicate the presence of MitM attack on that communication channel.

Figure 5:
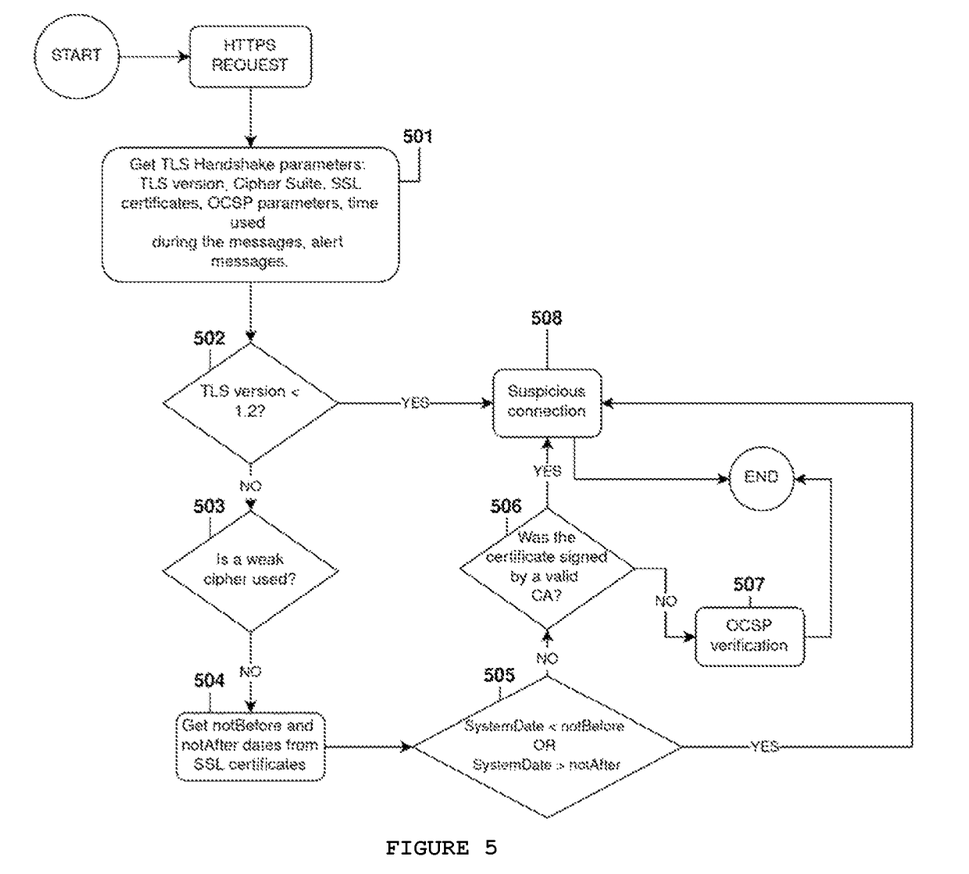
FIG. 5 illustrates an overview of the alternative embodiment of the present invention according to an embodiment.

On each HTTPS request made by the user, the method captures the parameters negotiated during the TLS Handshake, such as TLS version, Cipher Suite, SSL certificate (s), OCSP parameters, the time required to send and receive each message during the Handshake and alert messages (501). After each request, the method analyzes the parameters negotiated in the SSL/TLS Handshake and notifies the user if an attack is being performed. The current web servers use the TLS 1.2 or newer. The version TLS 1.1 or earlier are considered insecure versions and are not used in a normal connection between the user and the web servers. Thus, if the TLS 1.1 or earlier was chosen to be used in communication with a server (502), this is an indication that the traffic is being intercepted and modified, and the user is notified (507).

In the "ClientHello" message, the user application informs which Cipher Suites are supported, and in the "ServerHello" message, the web server responds which Cipher Suite should be used during the communication. The Elliptic Curve Diffie-Hellman (ECDHE) algorithm has a high priority due to the security of this method. Therefore, web servers on a normal connection must accept it. If the user application and the web server negotiate a Cipher Suite with another algorithm to perform the key exchange (503), it is an indication that the "ClientHello" or "ServerHello" message has been modified and a MITM attack is being performed (507).

If the TLS version chosen is the latest and the negotiated Cipher Suite is secure, many of the existing threats will be mitigated, but attackers can still rely on the use of SSL certificates. Therefore, additional security checks are performed to validate the integrity of the server certificate. Thus, the dates defined by the parameters "notBefore" and "notAfter" of the SSL certificates sent by the server are compared with the system date (505). In addition, the method verifies whether the SSL certificate has been signed by a Certificate Authority (CA) considered secure by the user (506). If the system date is outside the date range defined by the validity period of the certificates, or if the user does not recognize the CA that signed the certificates, the communication is considered suspicious (507).

Figure 6:
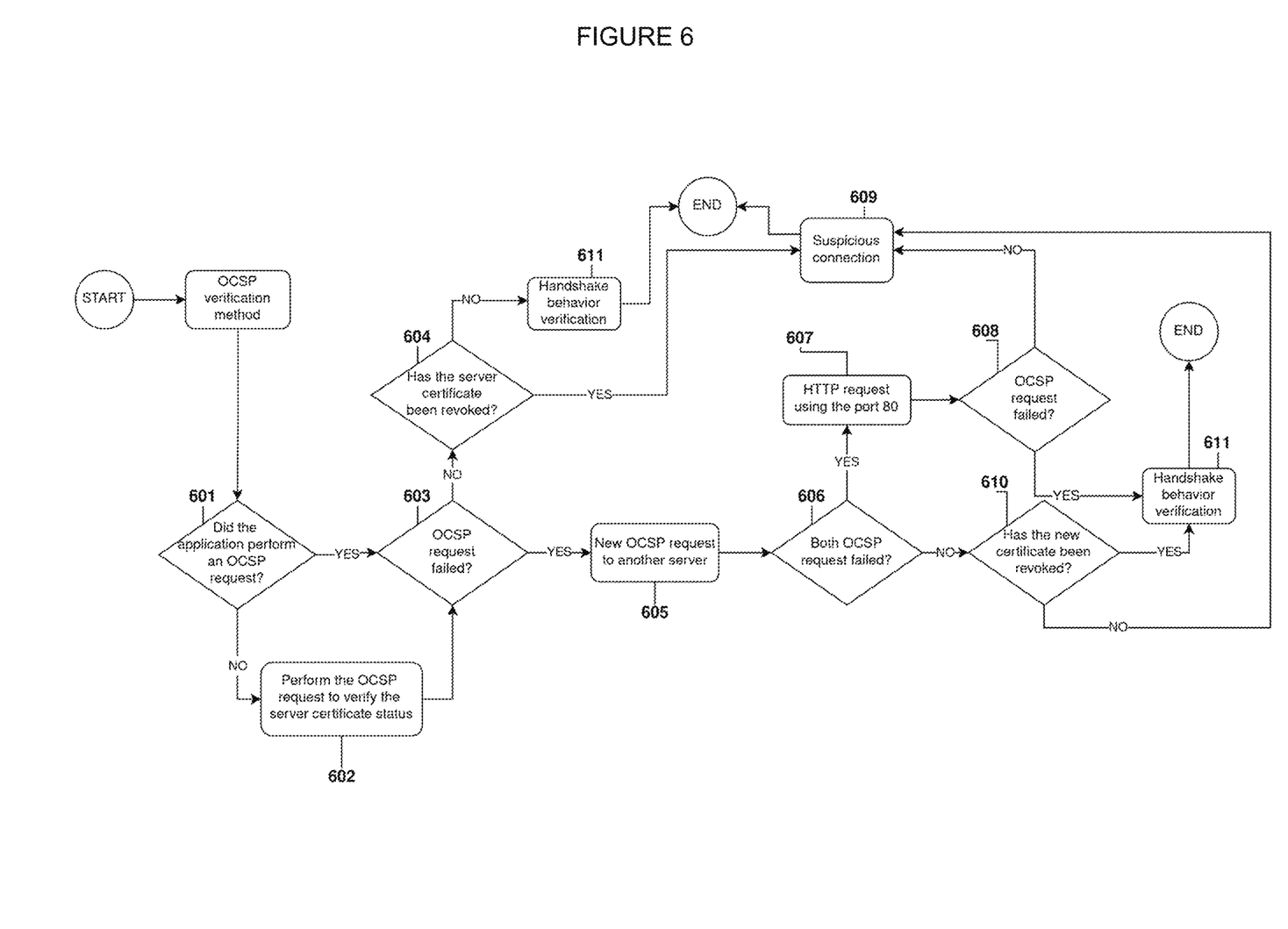
FIG. 6 illustrates operations of checking the OCSP requests and the use of revoked SSL certificates in the alternative embodiment according to an embodiment.

In addition, attackers can use a revoked SSL certificate to create a fake connection between the user and the web servers. Several methods can be used to verify that an SSL certificate has been revoked, such as the Certificate Revocation List (CRL) or the Online Certificate Status Protocol (OCSP). As the CRL method requires downloading a new certificate revocation list, the OCSP is used more because of less network traffic and no data storage is required. Thus, if the SSL certificate has OCSP parameters, this embodiment analyzes if the OCSP requests are sent and answered correctly by the network (507). Initially, the method verifies whether the application has performed the OCSP request to verify SSL certificate status (601). If no request was made, the method performs an OCSP request using the certificate parameters (602). If the OCSP request to CA of the server certificate was successful (603), it is checked whether the certificate has been revoked or not (604). If the certificate sent by the server has a revoked status, the communication is suspect (609). But if this request fails, a new OCSP request is made to another server using another revoked SSL certificate, configured earlier (605). If the status response was successful, the certificate status is checked (610). In this request, a revoked certificate was used, if the response is that the certificate is not revoked, it is an indication of an attack in the middle of the network (609). But if both OCSP requests fail (606), an HTTP request is made to test the connection on port 80 and the status of this request is verified (607). If this HTTP request is successful (608), it is an indication that OCSP requests are being blocked in the middle of the network, indicating that an attack is being performed (609). If the method does not detect an attack, the Handshake behavior is checked (611).

Figure 7:
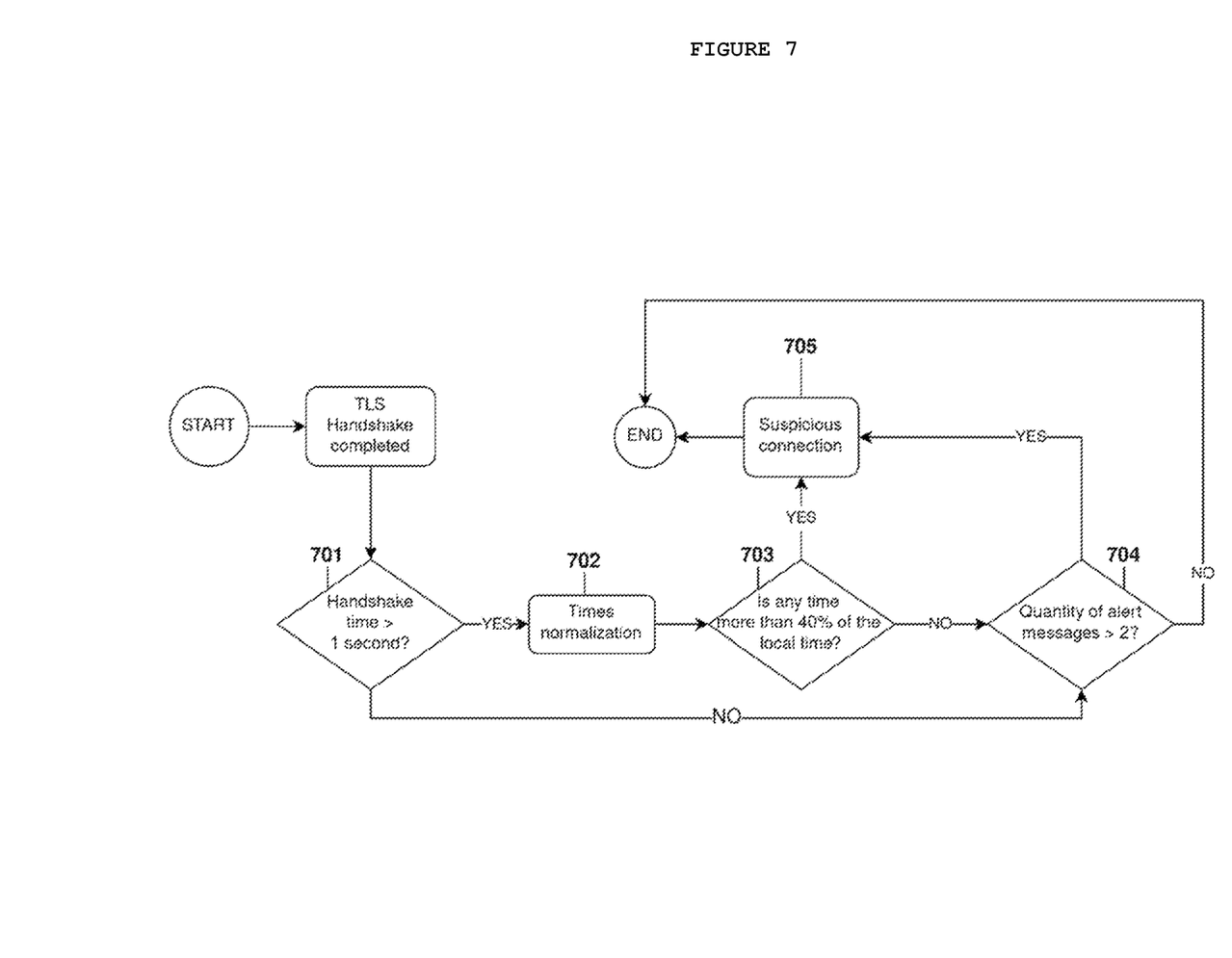
FIG. 7 illustrates operations of detecting abnormal TLS handshake behavior according to an embodiment.

Some attacks aim to read or modify specific Handshake messages to obtain information needed to intercept traffic between the user and the web server. To avoid a timeout during the handshake, attackers may send false SSL Alert Messages to indicate to the application that the server is processing some information and needs more time to finish the handshake. The SSL Alert Message is sent by the attacker with the objective of extending the timeout period until it reaches enough time to perform a processing operation on the transmitted data. To detect these attacks, the present invention further collects the time required to send and receive each handshake message and the data sent and received during operation (501) and analyzes the Handshake behavior (608). On a typical connection, the TLS Handshake takes approximately 500 milliseconds to complete. As this time may change, depending on network performance, we consider an abnormal Handshake when the total time is greater than a predefined time period, hereinafter defined as 1 second (701). Thus, each time it takes to send or receive a message is normalized on a scale from 0% to 100% (702). In addition, it is verified if any alert message was sent by the server (704). If an SSL Alert Message occurs, an SSL Alert Message occurs, the handshake is interrupted, and an alert message counter is increased by 1. Therefore, if any message takes longer than a threshold in relation to the total time of the TLS Handshake (703), defined as 40% for exemplification, or, if two or more alert messages were sent by the server (704) and the negotiation process did not stop at the first alert message, the connection is considered suspicious (705).

Although the present invention has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A method to detect attacks in an internet connection, comprising:
    receiving a list of N known and secure servers S;
    sending a HTTPS request to a server among the list of N known and secure servers S;
    for each HTTPS request successfully received, capturing parameters including at least a Transport Layer Security (TLS) version, a Cipher Suite, Secure Sockets Layer (SSL) certificates, Online Certificate Status Protocol (OCSP) parameters, a handshake time;
    analyzing TLS connections to determine whether a weak cipher suite or an old TLS version is being used;
    upon determining a TLS version is updated and a strong cipher is being used according to the analyzing, verifying the SSL certificates so as to determine whether the SSL certificates are suspicious or a system date was modified;
    provided no more than one suspicious SSL certificate among the SSL certificates is detected and the system date is unmodified, checking whether OCSP responses were blocked or modified;
    provided the OCSP responses are not blocked or modified, determining that no attack has been detected; and
    provided the OCSP responses are blocked or modified, determining the internet connection as suspicious.

2. The method as in claim 1, wherein the TLS version is considered old when earlier than TLS 1.1.

3. The method as in claim 1, wherein the system date is considered unmodified when the system date is within a range of parameters "notBefore" and "notAfter" of an SSL certificate: notBefore<system date<notAfter.

4. The method as in claim 3, wherein provided two or more SSL certificates are outside the range of parameters "notBefore" and "notAfter", determining the internet connection as suspicious.

5. The method as in claim 1, wherein the checking of the OCSP responses comprises:
    receiving the list of N known and secure servers S;
    creating OCSP request packets and sending OCSP requests to the N known and secure servers S;
    checking for OCSP request status for each server connection attempt;
    getting SSL certificate status for every successful OCSP request;
    checking whether first two statuses are revoked, and provided the first two statuses are not revoked, consider the internet connection as suspicious;
    provided the first two statuses are revoked, checking whether any other status are also revoked and further:
        provided the other status are not revoked, determining that no attack is detected;
        provided the other status are revoked, determining that a suspicious internet connection is detected.

6. The method as in claim 5, further comprising: provided all OCSP requests fail, sending N HTTP requests to OCSP servers:
    provided the N HTTP requests are successful, marking the internet connection as suspicious, provided the N HTTP requests are unsuccessful no attack is detected.

7. The method as in claim 5, wherein first two servers in the list of N known and secure servers S contain two revoked certificates and not revoked for the other.

8. The method as in claim 1, further comprising:
    checking whether the handshake time for the internet connection took more than 1 second;
    provided the handshake time took more than 1 second, normalizing time and verifying whether any time is more than threshold of the handshake time;
    provided any time is more than threshold of the handshake time, detecting the internet connection as a suspicious connection.

9. The method as in claim 8, wherein provided an SSL Alert Message occurs, the handshake is interrupted, and an alert message counter is increased by 1.

10. The method as in claim 8, wherein provided the Handshake time is less than 1 second and an alert message counter is more than 2, detecting the internet connection as a suspicious connection.

* * * * *